Feb. 7, 1950  R. P. LUTZ  2,496,948
INSULATION COMPOSITION FOR ELECTRICAL DEVICES
Filed Dec. 27, 1945

INVENTOR
R. P. LUTZ
BY Harry R. Duft
ATTORNEY

Patented Feb. 7, 1950

2,496,948

UNITED STATES PATENT OFFICE 2,496,948

INSULATION COMPOSITION FOR ELECTRICAL DEVICES

Raymond P. Lutz, Oak Park, Ill., assignor to Western Electric Company, Incorporated, New York, N. Y., a corporation of New York Application December 27, 1945, Serial No. 637,431

4 Claims. (Cl. 260—23)

1

This invention relates to the insulation of electrical devices and more particularly to an insulating composition and method for applying the composition to an electrical device.

An important problem in the manufacture of electrical apparatus is the application thereto of electrical insulation. The insulation serves not only to electrically insulate electrical conductors and other members from one another, but serves likewise to protect the apparatus from the undesirable effects of weather and moisture or water in particular. It is a well known phenomenon that insulations applied to electrical members when dry function satisfactorily but when exposed to moisture absorb it gradually and lose their resistance properties. In many cases the insulating requirements for electrical members specify that immersion in water should have no significant adverse effects upon the operation thereof. Electrical members such as coils, transformers, motors, capacitors and similar devices are frequently located in exposed conditions where they may be subject to rainfall, inundation by water, various corrosive atmospheres, metallic dusts, and the like. It is particularly desirable that the insulation applied to the apparatus should protect the conductors under these adverse conditions whereby normal functioning of the apparatus is maintained.

It has heretofore been proposed to encapsulate an electrical device in an outer shell of a resinous material and to fill the interior of the shell with a fluid penetrating resinous material, both the inner and outer insulating materials being heat treated to thermoset or cure the materials. One difficulty heretofore encountered was the fact that the resinous materials employed had poor wetting properties for the insulation of the electrical device, tending to leave voids and incompletely filled spaces or interstices. Another difficulty encountered was the fact that unpolymerized resinous materials are somewhat acid and would therefore attack the device being insulated if the time required for polymerization was too long.

The object of the present invention is to provide a thermosetting resinous material having good wetting properties for the insulation of electrical devices.

A further object is to provide a method of applying thermosetting resinous material to the insulating material of an electrical device to expedite the polymerization of the thermosetting resinous material.

Other objects and advantages of the invention will appear from the following description, taken in conjunction with the accompanying drawing, in which Fig. 1 is an elevational view partly in section showing an electrical device in the process of treatment;

2

Figure 1:
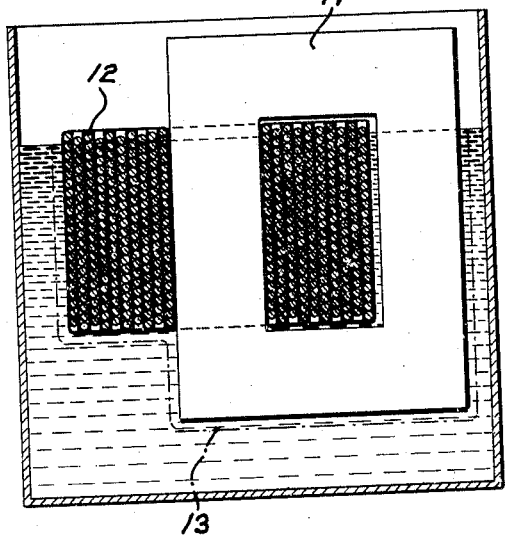
Figure 2:
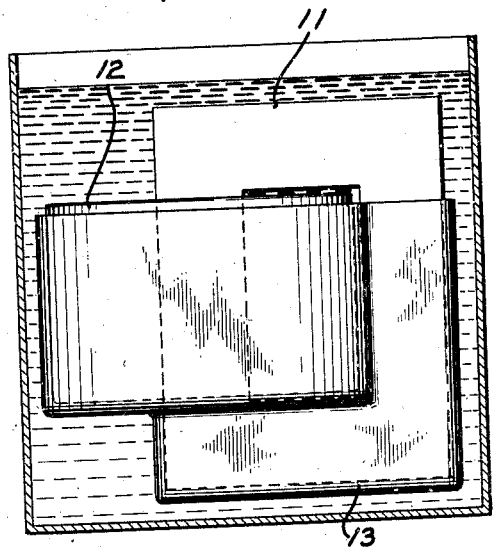
Fig. 2 is a similar view illustrating a further step in the process.
Figure 3:
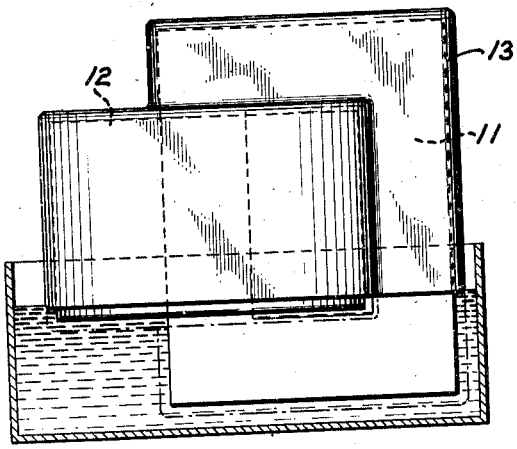
Fig. 3 is a similar view illustrating a still further step in the process.

The process of encapsulation and filling comprises essentially the steps as illustrated in Figs. 1 to 3 of applying an initial cup-like shell of a relatively thick resinous material to the exterior of the member being insulated as shown in Fig. 1.

Figure 4:
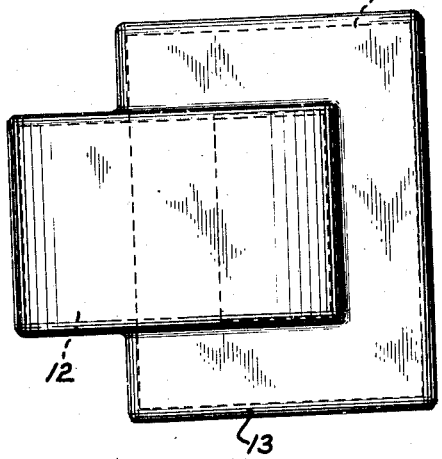
Fig. 4 is an elevational view of a completely insulated electrical device.

The electrical device shown in Fig. 1 as illustrating the invention comprises a core of magnetic material 11 provided with a coil 12. The device is immersed in relatively thick resinous material to such a depth as to leave a small open area at the upper end of the coil. This immersion will cause an open ended shell 13 of the material to be applied on the device as indicated by the dot and dash lines (Fig. 1). The device is then transferred to a heating oven to polymerize the resinous material in the shell 13. Thereafter it is immersed in a fluid penetrating solventless type of resin composition as illustrated in Fig. 2, the shell 13 serving to hold the penetrating resin in the device. The device is then again transferred to a baking oven to polymerize the fluid resinous material, after which the outer shell is completed as illustrated in Fig. 3 by dipping the open end of the device in a relatively thick resinous material. Upon polymerization of this thick enclosing layer the device is completed as shown in Fig. 4.

In the preferred embodiment of the invention in carrying out the process of encapsulation, two distinct types of resinous insulating materials may be employed. In order to provide the outer shell about an electrical device a relatively thick resinous material having thixotropic properties is desirable. The relatively thick resinous material should be capable of bridging small gaps in the insulation without penetrating far into the interior of the coil or the like. Generally the thick resinous material carries a filler composed of finely divided inorganic solid material in order to enable the building up of a relatively thick outer protective coating which may be from 5 mils to $\frac{1}{16}$" or more in thickness. A tool-thick coating compared to the size of the member obviously may be subject to cracking due to thermal expansion of the various elements of the encased member and may lack a certain degree of required flexibility. In the case of relatively large members such, for example, as large generator coils, such exterior coating of thick resin may be reinforced by means of tapes of inorganic fibrous material to provide for adequate mechanical characteristics.

One composition that may be used in practicing the invention is a resin composed of 100 parts by weight of castor oil and 30 parts by weight of maleic anhydride heated for several hours to produce a castor oil-maleate which is then dissolved in 30 parts by weight of monomeric styrene plus .02% of hydroquinone to inhibit premature polymerization. This material has somewhat poor wetting properties for insulation and has therefore the effect of being repelled by the insulation. It has been found that the addition of ½% of "Vinsol" increases the wetting power of the material so that it will effectively penetrate the insulating materials and spaces therebetween. "Vinsol" is a hard dark-colored resinous material comprising a gasoline-insoluble pine wood resin, produced by extracting resinous wood with a coal tar hydrocarbon by evaporation, extracting the residue with a petroleum hydrocarbon, removing the solvent and recovering the gasoline-insoluble resin as described in Patent No. 2,193,026, issued March 12, 1940 to Lucius C. Hall. When this material is used for the outer shell pulverized mica is added thereto to enhance the thixotropic properties of the solution and 1% of benzoyl peroxide catalyst is added, based on the weight of the resin components.

Another composition which may be used is a resin composed of 61 parts by weight of linseed oil, 15.8 parts of castor oil and 23.2 parts of maleic anhydride mixed together at a temperature of 175° to 200° C. and 75 parts of this resin is dissolved in 25 parts of monomeric styrene. .03% of hydroquinone is added as an inhibitor of premature polymerization and 1% by weight of benzoyl peroxide catalyst is added. When used as the outer coating pulverized mica is added to the composition. The addition of ½% "Vinsol" to this material increases its wetting properties as described in connection with the first illustration given.

Another material that may be effectively used is a solution of styrene with the ester reaction products of maleic acid and castor oil described in the copending application of Swiss et al., Serial No. 527,483, filed March 21, 1944, now U. S. Patent 2,439,953. To this composition is added ½% of "Vinsol" to increase its wetting properties. When these materials are used as the fluid impregnating and penetrating materials for the coil within the shell, the fillers such as mica are omitted.

It has been found that the catalysts used in the acceleration of polymerization of resinous materials such as the benzoyl peroxide deteriorate after being added to the resinous compositions, thereby increasing the length of time during which the materials remain unpolymerized and resulting in an attack of the slightly acid unpolymerized materials on the electrical device. This difficulty may be overcome by adding additional catalyst from time to time to maintain the optimum reaction time. In the treatment of transformer coils .12% to .25% of catalyst was added to the treating baths for every 8 hours that the bath was maintained for the dipping operation, resulting in the avoidance of an objectionable attack of the unpolymerized resinous material on the coils.

What is claimed is:

1. A coating composition for coating insulation of an electrical device comprising a thermosetting copolymer of 30 to 95 parts by weight of styrene and 5 to 70 parts by weight of an alkyd resin consisting of a half ester of castor oil and maleic acid to which is added approximately .5% by weight of a wetting agent consisting of an alcohol-soluble resin which is the residue produced by steaming pine wood chips to remove volatile substances therefrom, extracting the steamed wood chips with a coal tar hydrocarbon, evaporating the coal tar hydrocarbon and other volatile constituents of the extract from the extract to produce a solid residue, extracting rosin from said residue with a light petroleum hydrocarbon, and separating the extract from the light petroleum hydrocarbon - insoluble components of the original extraction of pine wood to facilitate the coating of said insulation with said material.

2. A coating composition for coating insulation of an electrical device consisting of a solution of from 75 to 95 parts by weight of styrene with from 5 to 25 parts by weight of the ester reaction product of castor oil and maleic acid to which has been added approximately .5% by weight of an alcohol-soluble resin which is the residue produced by steaming pine wood chips to remove volatile substances therefrom, extracting the steamed wood chips with a coal tar hydrocarbon, evaporating the coal tar hydrocarbon and other volatile constituents of the extract from the extract to produce a solid residue, extracting rosin from said residue with a light petroleum hydrocarbon, and separating the extract from the light petroleum hydrocarbon - insoluble components of the original extraction of pine wood to increase the wetting properties of the solution.

3. A coating composition for coating insulation of an electrical device comprising a solution of from 30 to 95 parts by weight of styrene with from 5 to 70 parts by weight of the ester reaction product of maleic acid and castor oil to which has been added approximately .5% by weight of an alcohol-soluble resin which is the residue produced by steaming pine wood chips to remove volatile substances therefrom, extracting the steamed wood chips with a coal tar hydrocarbon, evaporating the coal tar hydrocarbon and other volatile constituents of the extract from the extract to produce a solid residue, extracting rosin from said residue with a light petroleum hydrocarbon, and separating the extract from the light petroleum hydrocarbon-insoluble components of the original extraction of pine wood to improve its wetting properties.

4. A coating composition for coating insulation of an electrical device comprising a thermosetting copolymer of castor oil-maleate and styrene and approximately .5% by weight of an alcohol-soluble resin which is the residue produced by steaming pine wood chips to remove volatile substances therefrom, extracting the steamed wood chips with a coal tar hydrocarbon, evaporating the coal tar hydrocarbon and other volatile constituents of the extract from the extract to produce a solid residue, extracting rosin from said residue with a light petroleum hydrocarbon, and separating the extract from the light petroleum hydrocarbon-insoluble components of the original extraction of pine wood.

RAYMOND P. LUTZ.

REFERENCES CITED

The following references are of record in the file of this patent:

UNITED STATES PATENTS

| Number | Name | Date |
|---|---|---|
| 2,193,026 | Hall | Mar. 12, 1940 |
| 2,416,133 | Berberich | Feb. 18, 1947 |
| 2,423,872 | Clipper | July 15, 1947 |